United States Patent
Shi

(10) Patent No.: US 6,206,533 B1
(45) Date of Patent: Mar. 27, 2001

(54) FIBER OPTIC LIGHTED INSTRUMENT PANEL

(75) Inventor: Zhong-You Joe Shi, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/460,199

(22) Filed: Dec. 13, 1999

(51) Int. Cl.[7] ........................................................ F21V 8/00
(52) U.S. Cl. .................................. 362/23; 362/26; 362/556
(58) Field of Search ................................... 362/23, 26, 28, 362/29, 30, 554, 556, 582, 583, 555, 31

(56) References Cited

U.S. PATENT DOCUMENTS

| 3,861,781 | 1/1975 | Hasegawa et al. . | |
|---|---|---|---|
| 4,422,719 | * 12/1983 | Orcutt | 362/32 |
| 4,747,658 | 5/1988 | Borsuk et al. . | |
| 4,759,600 | 7/1988 | Caron et al. . | |
| 5,027,259 | * 6/1991 | Chujko | 362/26 |
| 5,050,956 | 9/1991 | Carpenter et al. . | |
| 5,321,784 | 6/1994 | Cubukciyan et al. . | |
| 5,606,637 | * 2/1997 | Dolby | 362/32 |
| 5,816,626 | 10/1998 | Anderson et al. . | |

FOREIGN PATENT DOCUMENTS

| 63-64007 | 3/1988 | (JP) . |
|---|---|---|
| 1-134406 | 5/1989 | (JP) . |
| 2-85808 | 3/1990 | (JP) . |

* cited by examiner

*Primary Examiner*—Y. Quach
(74) *Attorney, Agent, or Firm*—Larry I. Shelton

(57) ABSTRACT

A fiber optic lighted instrument panel includes an instrument panel having at least one portion to be illuminated and adapted to be disposed in an occupant compartment of a vehicle. The fiber optic lighted instrument panel also includes a fiber optic light cable extending around the at least one portion. The fiber optic lighted instrument panel further includes a light source connected to the fiber optic light cable to illuminate the at least one portion of the instrument panel.

17 Claims, 1 Drawing Sheet

FIBER OPTIC LIGHTED INSTRUMENT PANEL

BACKGROUND OF THE INVENTION

1. Field of the Invention

The present invention relates generally to instrument panels for vehicles and, more specifically, to a fiber optic lighted instrument panel for a vehicle.

2. Description of the Related Art

It is known to provide an instrument panel for a vehicle such as a motor vehicle. The instrument panel extends laterally across an occupant compartment of the motor vehicle in front of seated occupants therein. The instrument panel typically includes a number of gages such as a speedometer. These gages are typically illuminated by backlighting with incandescent lamps disposed behind the gages.

It is also known that fiber optic light cables are used for high-speed communication and data transmission. It is also known that these fiber optic light cables consist of a core, cladding and a protective jacket. The core has a higher refractive index than that of the cladding so that the light is confined within the core if the incident angle is less than the critical angle. This is the principle of telecommunication with optical fiber light cables.

Therefore, there is a need in the art to provide a fiber optic lighted instrument panel for a vehicle. Also, there is a need in the art to provide a fiber optic light cable to illuminate an instrument panel for a vehicle. Further, there is a need in the art to eliminate backlighting of gages in an instrument panel.

SUMMARY OF THE INVENTION

Accordingly, the present invention is a fiber optic lighted instrument panel includes an instrument panel having at least one portion to be illuminated and adapted to be disposed in an occupant compartment of a vehicle. The fiber optic lighted instrument panel also includes a fiber optic light cable extending around the at least one portion. The fiber optic lighted instrument panel further includes a light source connected to the fiber optic light cable to illuminate the at least one portion of the instrument panel.

One feature of the present invention is that a fiber optic lighted instrument panel is provided for a vehicle. Another feature of the present invention is that the fiber optic lighted instrument panel provides a fiber optic cable and a light emitting diode (LED) to illuminate an instrument panel for a vehicle. Yet another feature of the present invention is that the fiber optic lighted instrument panel saves energy, extends the lifetime of the illumination apparatus, reduces weight and cost, and makes the instrument panel more appealing. Still another feature of the present invention is that the fiber optic lighted instrument panel has the cladding on the fiber optic light cable purposely scratched on one side so that light is leaked out to illuminate a desired area such as a gage. A further feature of the present invention is that the fiber optic lighted instrument panel eliminates backlighting of gages on the instrument panel.

Other features and advantages of the present invention will be readily appreciated, as the same becomes better understood after reading the subsequent description when considered in connection with the accompanying drawings.

DESCRIPTION OF THE PREFERRED EMBODIMENT(S)

Figure 1:
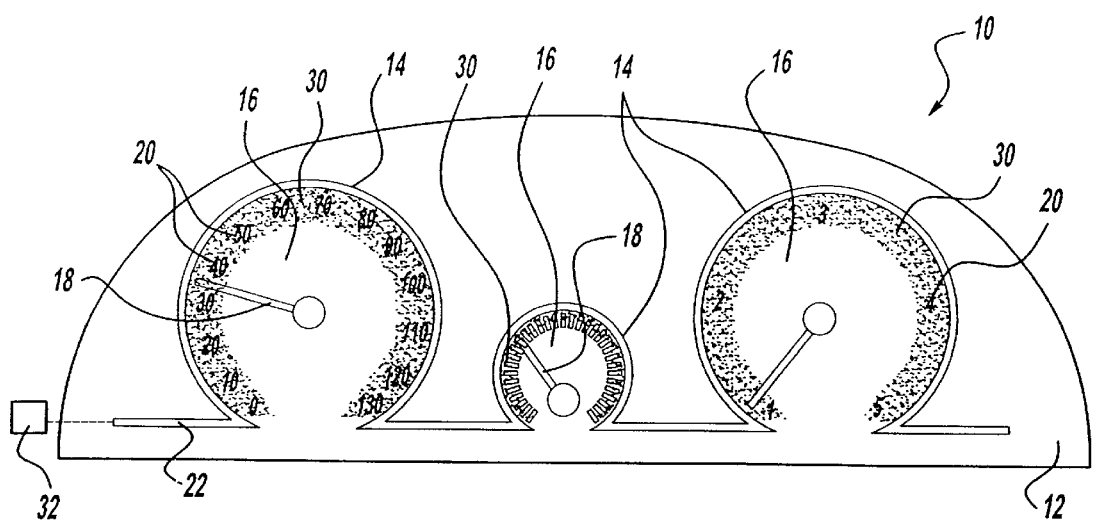
FIG. 1 is an elevational view of a fiber optic lighted instrument panel, according to the present invention.
Figure 2:
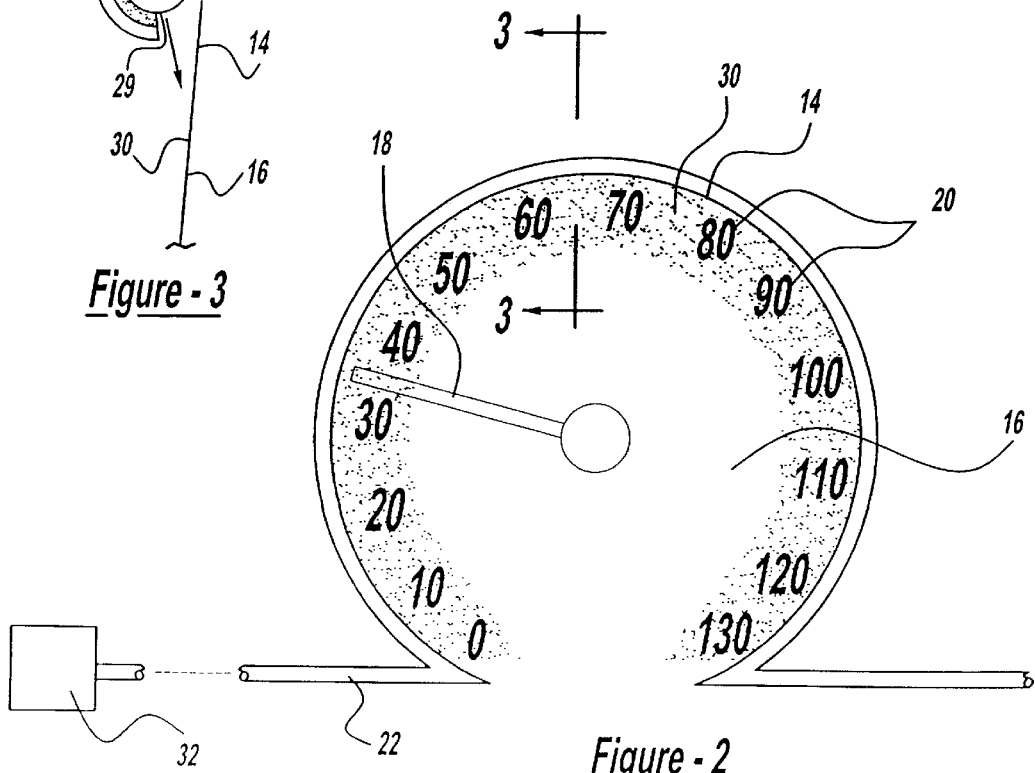
FIG. 2 is an enlarged elevational view of a portion of the fiber optic lighted instrument panel of FIG. 1.

Referring to the drawings and in particular FIGS. 1 and 2, one embodiment of a fiber optic lighted instrument panel 10, according to the present invention, is shown for a vehicle (not shown) such as a motor vehicle. The fiber optic lighted instrument panel 10 includes an instrument panel 12, which extends laterally across an occupant compartment (not shown) of the vehicle. The instrument panel 12 includes at least one, preferably a plurality of meters or gages 14 such as a speedometer, tachometer and the like as is known in the art. The gages 14 have a gage member 16 and a needle 18 pivotally connected to the gage member 16. The gage member 16 is generally circular in shape and has a plurality of indicia 20 such as numbers spaced circumferentially about a periphery thereof. The needle 18 moves or pivots in response to a signal from a controller (not shown). It should be appreciated that the gages 14 are conventional and known in the art.

Figure 3:
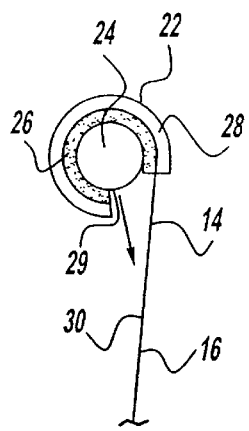
FIG. 3 is a sectional view taken along line 3—3 of FIG. 2.

Referring to FIGS. 1 through 3, the fiber optic lighted instrument panel 10 also includes a fiber optic light cable 22 disposed about a portion of a periphery of the gages 14. The fiber optic light cable 22 has a core 24, cladding 26 disposed about the core 24 and a protective jacket 28 disposed about the cladding 26. The fiber optic light cable 22 extends longitudinally toward a base of the gage member 16 and circumferentially around the periphery of the gage member 16 and longitudinally away from the base of the gage member 16. The cladding 26 and protective jacket 28 are purposely scratched or removed on one side of the fiber optic light cable 22 to form an aperture 29 as it extends around the gage member 16 so that the light transferred inside the core 24 is leaked out to illuminate a desired area 30 of the gage member 16. Alternatively, the core 24 of the fiber optic light cable 22 can be doped with a specific dye so that it can fluoresce when excited by the passing light to provide colored illumination of the gage member 16. The fiber optic light cable 22 is made of a plastic material. The fiber optic light cable 22 has a generally circular cross-sectional shape and a relatively large diameter. The fiber optic light cable 22 may be a single cable or a plurality of cables bundled together to form a single cable. The fiber optic light cable 22 is secured to the instrument panel 12 by suitable means such as an adhesive. It should be appreciated that, except for removing the cladding 26 and protective jacket 28 from the fiber optic light cable 22, the fiber optic light cable 22 is conventional and known in the art.

The fiber optic lighted instrument panel 10 includes a light source 32 connected to at least one end of the fiber optic light cable 22. The light source 32 can be either a light emitting diode (LED), conventional incandescent lamp, a diode laser or the like. The light source 32 may be colored to produce a light having different colors for illuminating light of the instrument panel 12. It should be appreciated that more than one light source 32 can be provided and attached to one or both ends of the fiber optic light cable 22. It should also be appreciated that the light source 32 reduces the cost and weight and improves durability of the fiber optic lighted instrument panel 10.

In operation of the fiber optic lighted instrument panel 10, the light source 32 is connected to the fiber optic light cable 22. The light source 32 emits light, which travels through the core 24 of the fiber optic light cable 22 and is emitted from the core 24 through the aperture formed from removing a portion of the cladding 26 and protective jacket 28. The emitted light, as indicated by the arrow in FIG. 3, illuminates the desired area 30 of the gage member 16 so that the seated occupant can visually read the indicia 20. It should be appreciated that the light source 32 is connected to a source of power (not shown).

In another embodiment of the present invention, the needle 18 of the gages 14 maybe a light emitting diode for high durability, light weight, choice of colors and appealing power. The needle 18 can be either connected to the fiber optic light cable 22 with the aperture 29 formed therein to leak or emit light as described above or the needle 18 is a part of the light source 32. The needle 18 can be lighted in the same manner as the gage member 16. Also, the needles 18 may have a light emitting diode of a different color for each gage 14 so that easier reading of the gages 14 can be achieved. It should be appreciated that the light source 32 is made as the same shape as the needle 18 so that the needle 18 is an illuminating part of the light source 32 such as the LED. It should also be appreciated that the light source 32 may be a laser or incandescent bulb.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A motor vehicle having a fiber optic lighted instrument panel comprising:
   an occupant compartment;
   an instrument panel having at least one first portion to be illuminated disposed in said occupant compartment;
   a fiber optic light cable extending around said at least one first portion and having a second portion removed on one side of said fiber optic light cable to form an aperture; and
   a light source connected to said fiber optic light cable so that light is leaked out said aperture to illuminate said at least one first portion of said instrument panel.

2. A motor vehicle having a fiber optic lighted instrument panel as set forth in claim 1 wherein said fiber optic light cable has a core and a cladding extending around said core.

3. A motor vehicle having a fiber optic lighted instrument panel as set forth in claim 2 wherein said fiber optic light cable is made of a plastic material.

4. A motor vehicle having a fiber optic lighted instrument panel as set forth in claim 2 wherein said fiber optic light cable includes a protective jacket disposed about said cladding.

5. A motor vehicle having a fiber optic lighted instrument panel as set forth in claim 2 wherein said core has a dye disposed thereabout to allow said core to emit a colored light.

6. A motor vehicle having a fiber optic lighted instrument panel as set forth in claim 1 wherein said light source emits a colored light.

7. A motor vehicle having a fiber optic lighted instrument panel as set forth in claim 1 wherein said at least one first portion is a gage.

8. A motor vehicle having a fiber optic lighted instrument panel as set forth in claim 7 wherein said gage comprises a gage member having indicia disposed circumferentially thereabout and a needle pivotally connected to said gage member.

9. A motor vehicle having a fiber optic lighted instrument panel as set forth in claim 8 wherein said needle includes a light emitting diode.

10. A motor vehicle having a fiber optic lighted instrument panel as set forth in claim 9 wherein said fiber optic light cable is connected to said needle.

11. A motor vehicle having a fiber optic lighted instrument panel comprising:
    an occupant compartment;
    an instrument panel having a plurality of gages to be illuminated disposed in said occupant compartment;
    a fiber optic light cable extending around each of said gages, said fiber optic light cable comprising a core and a cladding around said core wherein a portion of said cladding is removed to form an aperture; and
    a light source connected to said fiber optic light cable so that light is leaked out said aperture to illuminate a desired area on each of said gages of said instrument panel.

12. A motor vehicle having a fiber optic lighted instrument panel as set forth in claim 11 wherein said fiber optic light cable includes a protective jacket disposed about said cladding.

13. A motor vehicle having a fiber optic lighted instrument panel as set forth in claim 11 wherein said core has a dye disposed thereabout to allow said core to emit a colored light.

14. A motor vehicle having a fiber optic lighted instrument panel as set forth in claim 11 wherein said light source emits a colored light.

15. A motor vehicle having a fiber optic lighted instrument panel as set forth in claim 11 wherein each of said gages comprises a gage member having indicia disposed circumferentially thereabout and a needle pivotally connected to said gage member.

16. A motor vehicle having a fiber optic lighted instrument panel as set forth in claim 11 wherein said fiber optic light cable is made of a plastic material.

17. A motor vehicle having a fiber optic lighted instrument panel comprising:
    an occupant compartment;
    an instrument panel having a plurality of gages to be illuminated disposed in said occupant compartment, each of said gases comprising a gage member having indicia disposed circumferentially thereabout and a needle pivotally connected to said gage member;
    a fiber optic light cable extending around each of said gages, said fiber optic light cable comprising a core and a cladding extending around said core, wherein a portion of said cladding is removed to form an aperture; and
    a light source connected to said fiber optic light cable to allow light from said core to be emitted through said aperture to illuminate a desired area on each of said gages of said instrument panel.

* * * * *